United States Patent
Baughman et al.

(10) Patent No.: US 12,437,220 B2
(45) Date of Patent: *Oct. 7, 2025

(54) COMBINED CLASSICAL/QUANTUM PREDICTOR EVALUATION WITH MODEL ACCURACY ADJUSTMENT

(71) Applicant: International Business Machines Corporation, Armonk, NY (US)

(72) Inventors: Aaron K. Baughman, Cary, NC (US); Gururaja Hebbar, Frisco, TX (US); Micah Forster, Round Rock, TX (US); Kavitha Hassan Yogaraj, Bangalore (IN); Yoshika Chhabra, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,666

(22) Filed: May 20, 2024

(65) Prior Publication Data

US 2024/0303518 A1 Sep. 12, 2024

Related U.S. Application Data

(63) Continuation of application No. 17/410,553, filed on Aug. 24, 2021, now Pat. No. 12,061,952.

(51) Int. Cl.
*G06F 15/16* (2006.01)
*G06F 40/20* (2020.01)
*G06N 10/00* (2022.01)

(52) U.S. Cl.
CPC ............ *G06N 10/00* (2019.01); *G06F 15/16* (2013.01); *G06F 40/20* (2020.01)

(58) Field of Classification Search
CPC .... G06F 16/2455; G06F 16/906; G06F 18/23; G06F 2111/20; G06F 30/27; G06F 30/28;
(Continued)

(56) References Cited

U.S. PATENT DOCUMENTS 8,190,553 B2  5/2012  Routt
8,903,716 B2  12/2014 Chen et al.
(Continued)

FOREIGN PATENT DOCUMENTS

CA      2883313 A1    3/2014
JP    2019-513249 A   5/2019
(Continued)

OTHER PUBLICATIONS

List of all IBM related dockets, 2024.
(Continued)

*Primary Examiner* — Binh C Tat
(74) *Attorney, Agent, or Firm* — Garg Law Firm, PLLC; Rakesh Garg; Michael O'Keefe

(57) ABSTRACT

Using a model executing on a classical processor, a set of classical features is scored. The scored set of classical features is divided into a set of feature groups, a number of classical features in a group determined according to a qubit capability of a quantum processor. Using a model executing on the quantum processor and a group of the scored set of classical features, a set of quantum features is scored. The score of a quantum feature is adjusted according to an accuracy of the quantum data model. The scored set of classical features and the scored set of quantum features are combined according to a measure of differences between the scored set of classical features and the scored set of quantum features. Using the combined set of scored features and a first set of input data of a resource, a valuation of a resource is calculated.

25 Claims, 11 Drawing Sheets

(58) Field of Classification Search
CPC .......... G06F 9/451; G06F 21/10; G06F 40/56; G06F 21/44; G06F 21/6245; G06F 21/64; G06N 20/00; G06N 3/08; G06N 10/60; G06N 3/09; G06N 10/00; G06N 10/80; G06N 3/049; G06N 3/0495; G06N 3/091; G06N 3/092; G06N 10/70; G06N 10/20; G06N 10/40; G06N 3/045; G06N 3/0464
USPC .................................................. 716/100–108
See application file for complete search history.

(56) References Cited

U.S. PATENT DOCUMENTS

| | | |
|---|---|---|
| 9,195,949 B2 | 11/2015 | Kasabov |
| 9,270,385 B2 | 2/2016 | Meyers et al. |
| 9,727,959 B2 | 8/2017 | Meyers et al. |
| 10,318,966 B2 | 6/2019 | Ettl et al. |
| 10,380,613 B1 | 8/2019 | Liu |
| 10,452,989 B2 | 10/2019 | Majumdar |
| 10,489,845 B2 | 11/2019 | Mullakkara et al. |
| 10,572,890 B2 | 2/2020 | Lederman et al. |
| 10,733,521 B2 | 8/2020 | Levin |
| 10,796,271 B2 | 10/2020 | Beach-Drummond |
| 11,010,436 B1 | 5/2021 | Peng et al. |
| 11,132,422 B2 | 9/2021 | Chen et al. |
| 11,574,030 B1 | 2/2023 | Harrigan et al. |
| 11,580,438 B1 | 2/2023 | Mcmahon et al. |
| 11,714,971 B2 | 8/2023 | Wray et al. |
| 12,061,952 B2 | 8/2024 | Baughman et al. |
| 2014/0156392 A1 | 6/2014 | Ouimet et al. |
| 2015/0006443 A1* | 1/2015 | Rose ................. G06N 20/00 706/12 |
| 2015/0222619 A1 | 8/2015 | Hughes et al. |
| 2016/0321559 A1* | 11/2016 | Rose ................. G06N 10/60 |
| 2016/0328253 A1 | 11/2016 | Majumdar |
| 2017/0011465 A1* | 1/2017 | Anastassov ........... G06Q 40/08 |
| 2017/0109612 A1 | 4/2017 | Mittal et al. |
| 2017/0228505 A1 | 8/2017 | Allen et al. |
| 2017/0278181 A1 | 9/2017 | Shah |
| 2019/0096526 A1 | 3/2019 | Hirsch et al. |
| 2019/0138553 A1 | 5/2019 | Maharajh et al. |
| 2020/0143910 A1 | 5/2020 | Noori et al. |
| 2021/0019132 A1 | 1/2021 | Gambetta et al. |
| 2021/0065294 A1 | 3/2021 | Trevathan et al. |
| 2021/0090154 A1 | 3/2021 | Michaelson et al. |
| 2021/0125612 A1 | 4/2021 | Coman et al. |
| 2021/0216629 A1 | 7/2021 | Miller et al. |
| 2021/0216631 A1 | 7/2021 | Child et al. |
| 2022/0253871 A1 | 8/2022 | Miller et al. |
| 2023/0010615 A1 | 1/2023 | Baughman et al. |
| 2023/0011645 A1 | 1/2023 | Baughman et al. |
| 2023/0023121 A1 | 1/2023 | Cao |
| 2023/0419155 A1 | 12/2023 | You et al. |

FOREIGN PATENT DOCUMENTS

| | | |
|---|---|---|
| KR | 10-2018-0004226 | 1/2018 |
| WO | 2022/043512 A1 | 3/2022 |

OTHER PUBLICATIONS

Allcock et al., "Quantum Algorithms for Feedforward Neural Networks", ACM Transactions on Quantum Computing, vol. 1, Issue 1, Sep. 2020, Article No. 6, pp. 1-24.

Amellal et al., "Effectiveness of quantum algorithms on classical computing complexities", SCA'18, Oct. 10-11, 2018, 3 Pages.

Amos et al., "One-shot signatures and applications to hybrid quantum/classical authentication", STOC 2020: Proceedings of the 52nd Annual ACM SIGACT Symposium on Theory of Computing, Jun. 22, 2020, pp. 255-268.

Angara et al., "Hybrid quantum-classical problem solving in the NISQ era", GASCON '20: Proceedings of the 30th Annual International Conference on Computer Science and Software Engineering, Nov. 2020, pp. 247-252, https://dl.acm.org/doi/10.5555/3432601.3432634.

Briffaut, "Uncertainty in virtual collaborative contexts", https://ieeexplore.ieee.org/document/7461430, Jun. 22-24, 2009, 8 pages.

Chen et al., "A Quantum Feature Selection Algorithm for Multi-Classification Problem", 2019 International Conference on Internet of Things (iThings) and IEEE Green Computing and Communications (GreenCom) and IEEE Cyber, Physical and Social Computing (CPSCom) and IEEE Smart Data (SmartData), Jul. 14-17, 2019.

Disclosed Anonymously, IP.com No. IPCOM000255049D "Fit for Purpose Processing in the Quantum World", Aug. 28, 2018, 7 pages.

Disclosed Anonymously, IP.com No. IPCOM000261173D "System and Method to Assess Quantum Use Case Potential", Feb. 5, 2020, 5 Pages.

Disclosed Anonymously, IP.com No. IPCOM000261581D Quantum Developer Visualization Tool (QDVT), Mar. 18, 2020, 8 Pages.

Disclosed Anonymously, IP.com No. IPCOM000262775D "Quantum Affinity Assessment", Jun. 29, 2020, 11 pages.

Dong et al., "User action interpretation for personalized content optimization in recommender systems", CIKM '11: Proceedings of the 20th ACM international conference on Information and knowledge management, Oct. 24, 2011, pp. 2129-2132.

Glover et al., "Quantum Bridge Analytics I: A Tutorial on Formulating and Using QUBO Models", https://arxiv.org/abs/1811.11538, 2019, 46 pages.

Golrezaei et al., "Real-time optimization of personalized assortments", EC '13: Proceedings of the fourteenth ACM conference on Electronic commerce, Jun. 2013, pp. 561-562.

Guo et al., "System and method for providing personalized advertisements to offline retailer users", 2017 8th IEEE International Conference on Software Engineering and Service Science (ICSESS), Nov. 24-26, 2017, https://ieeexplore.ieee.org/document/8343014.

Huang et al., "A Strategic Framework For Artificial Intelligence In Marketing", Journal Of The Academy Of Marketing Science, vol. 49, Issue 1, pp. 30-50, Nov. 4, 2020.

Hui-Huang Hsu, "Hybrid feature selection by combining filters and wrappers", Expert Systems with Applications 38, 2011, 8144-8150.

Jain et al., "Transforming Marketing With Artificial Intelligence", International Research Journal Of Engineering and Technology (IRJET), vol. 7, Issue 7, pp. 3964-3974, Jul. 2020.

Jung et al., "An Information-Theoretic Approach To Personalized Explainable Machine Learning", IEEE Signal Processing Letters, vol. 27, pp. 825-829, Mar. 15, 2020.

Kato, "A study on application of Artificial Intelligence (AI) for cosmetics: Quantum computer is necessary for Beauty-field analysis", 2018 International Conference on Electronics Packaging and iMAPS All Asia Conference (ICEP-IAAC), Apr. 17-21, 2018.

Kechrimparis et al., "Channel Coding of a Quantum Measurement", IEEE Journal on selected areas in communications, Mar. 2020, 10 pages, vol. 38, No. 3.

Khrennikova et al. "Asset Trading Under Non-Classical Ambiguity and Heterogeneous Beliefs", Physica A: Statistical Mechanics and its Applications, Jan. 15, 2019, pp. 562-577.

Kiefl et al., "Software Engineering Education of Classical Computing vs. Quantum Computing: A Competency-Centric Approach", ECSEE, Jun. 18, 2020, 5 pages.

Kimbler et al., "Value added mobile broadband services Innovation driven transformation of the 'smart pipe'", 2012 16th International Conference on Intelligence in Next Generation Networks, Oct. 8-11, 2012.

Kouki et al., "Generating And Understanding Personalized Explanations In Hybrid Recommender Systems", ACM Transactions on Interactive Intelligent Systems, vol. 10, No. 4, Article 31, pp. 1-40, Nov. 2020.

Mabuchi et al., "Dynamical identification of open quantum systems", Quantam Semiclass, Jun. 14, 1996, 1103-1108.

Malinverni et al ., "A conceptual framework to compare two paradigms of Augmented and Mixed Reality experiences", IDC, Jun. 19-22, 2018, 12 pages.

Molmer, "Quantum information tools", 2013 Conference on Lasers & Electro-Optics Europe & International Quantum Electronics

(56) References Cited

OTHER PUBLICATIONS

Conference CLEO EUROPE/IQEC, May 12-16, 2013, https://ieeexplore.ieee.org/document/6801705, 1 page.

Nayak et al., "Limits on the ability of quantum states to convey classical messages", Journal of the ACM, Jan. 1, 2006, pp. 184-206, vol. 53, No. 1.

Ramos et al. "Quantum-inspired Evolutionary Algorithm for Feature Selection in Motor Imagery EEG Classification", IEEE Congress on Evolutionary Computation (CEC), Jul. 8-13, 2018, 8 pages.

Rojo et al., "Trials and Tribulations of Developing Hybrid Quantum-Classical Microservices Systems", arXiv:2105.04421 v1 [cs.SE] (Year: 2021).

Sasaki et al., "Principle and Application of a Sensitive Handy Electrooptic Probe for Sub-100-MHz Frequency Range Signal Measurements", IEEE Transactions on Instrumentation and Measurement, vol. 57, Issue: 5, May 2008.

Song et al., "Personalized optimization for android smartphones", ACM Transactions on Embedded Computing Systems, vol. 13, Issue 2s, Jan. 27, 2014, Article No. 60, pp. 1-25.

Tsukuda et al., "DualDiv: Diversifying Items And Explanation Styles In Explainable Hybrid Recommendation", RecSys'19, pp. 398-402, Sep. 16-20, 2019.

Windridge et al. "Quantum Bootstrap Aggregation", International Symposium on Quantum Interaction, Springer, Cham, 2016, pp. 115-121.

Wingerath et al., "Speed Kit: A Polyglot & GDPR-Compliant Approach For Caching Personalized Content", 2020 IEEE 36th International Conference on Data Engineering (ICDE), Apr. 20-24, 2020.

Yarkoni et al., "Quantum Shuttle: traffic navigation with Quantum computing", APEQS 2020: Proceedings of the 1st ACM SIGSOFT International Workshop on Architectures and Paradigms for Engineering Quantum Software, Nov. 13, 2020, pp. 22-30. I.

Zhou et al., "Feature Selection based on OFT", Third International Conference on Natural Computation (ICNC 2007), Aug. 24-27, 2007, 5 pages.

Chakraborty et al. A hybrid quantum feature selection algorithm using a quantum inspired graph theoretic approach, Applied Intelligence, 2020, 19 pages.

Cremonesi et al. "Practical Quantum Computing: a Collaborative-Driven Quantum Feature Selection Approach for the Cold-Start Problem in Recommender Systems", Riccardo Nembrini, Politecnico di Milanom Master's Thesis, https://www.politesi.polimi.it/retrieve/8053bad3-90aa-4f2c-8ffb-eb942b50b58d/2020_10_Nembrini.pdf, 2019, 104 pages.

Farhi, et al., A Quantum Approximate Optimization Algorithm, arXiv:1411.4028v1, Nov. 14, 2014, 16 pages.

* cited by examiner

COMBINED CLASSICAL/QUANTUM PREDICTOR EVALUATION WITH MODEL ACCURACY ADJUSTMENT

BACKGROUND

The present invention relates generally to a method, system, and computer program product for data attribute evaluation. More particularly, the present invention relates to a method, system, and computer program product for combined classical/quantum predictor evaluation with model accuracy adjustment.

A predictor variable, or predictor, is a variable used to estimate or forecast a future event or outcome. For example, when evaluating computing resource configurations for deployment within a data center, example predictors might be the number of processors in each system, the speed of each processor, the network bandwidth available to each computing resource, and the amount of storage available to each computing resource, and the forecast outcome might be a data throughput of the entire data center once a particular resource configuration has been deployed. Data modelling often includes analyzing one or more predictors, as well as the relative weights of each predictor, to determine the strength and direction of a predictor's association with a particular outcome or criterion. Predictor valuation refers to valuing a predictor's ability to predict a desired outcome.

Hereinafter, a "Q" prefix in a word of phrase is indicative of a reference of that word or phrase in a quantum computing context unless expressly distinguished where used.

Nature—including molecules—follows the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a processor fabricated using semiconductor technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits) to perform computational tasks. In the particular realms where quantum mechanics operates, particles of matter can exist in multiple states-such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1 s and 0 s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0) can depend on the state of another, and that there is more information that can be ascertained about the two qubits when they are entangled than when they are treated individually. Using these two principles, qubits operate as more sophisticated processors of information, enabling quantum computers to function in ways that allow them to solve difficult problems that are intractable using conventional computers. IBM has successfully constructed and demonstrated the operability of a quantum processor (IBM is a registered trademark of International Business Machines corporation in the United States and in other countries.)

The illustrative embodiments recognize that predictor valuation, and selection of the best (i.e. highest valued) predictors, determines the accuracy of the outcome the predictors predict. However, classical computing techniques for predictor valuation and selection, such as statistical analysis, predictive modeling, or a combination of classical approaches are insufficiently accurate, insufficiently personalizable to a specific user need, and fast enough to analyze data at the scale, volume, and velocity needed today. Thus, the illustrative embodiments recognize that there is an unmet need for predictor valuation that is more accurate and more quickly computable than the techniques currently available.

SUMMARY

The illustrative embodiments provide a method, system, and computer program product. An embodiment includes a method that scores, using a classical data model executing on a classical processor, a set of classical features, a classical feature in the set of classical features comprising a first attribute of a resource, a score of the classical feature comprising an evaluation of a utility of the classical feature in predicting a result involving the resource, the scoring resulting a scored set of classical features. An embodiment divides, into a set of feature groups, the scored set of classical features, a number of classical features in a feature group in the set of feature groups determined according to a qubit capability of a quantum processor. An embodiment scores, using a quantum data model executing on the quantum processor and a feature group of the scored set of classical features, a set of quantum features, a quantum feature in the set of quantum features comprising a second attribute of the resource, a score of the quantum feature comprising an evaluation of a utility of the quantum feature in predicting the result, the scoring resulting a scored set of quantum features. An embodiment adjusts, according to an accuracy of the quantum data model, the score of the quantum feature. An embodiment combines, forming a combined set of scored features, the scored set of classical features and the scored set of quantum features, the combining performed according to a measure of differences between the scored set of classical features and the scored set of quantum features. An embodiment calculates, using the combined set of scored features and a first set of input data of a resource, a valuation of the resource. Thus, the embodiment provides a method of combined classical/quantum predictor evaluation with model accuracy adjustment.

In another embodiment, members of each feature group in the set of feature groups are determined according a ranking, the ranking determined according to a score of each classical feature in the scored set of classical features. Thus, the embodiment provides combined classical/quantum predictor evaluation with model accuracy adjustment, using ranked classical features.

In another embodiment, adjusting, according to the accuracy of the quantum data model, the score of the quantum feature comprises computing, for each score in the set of scored quantum features using the accuracy of the quantum data model, an adjusted score; and normalizing, by dividing each adjusted score by a sum of adjusted scores, each adjusted score. Thus, the embodiment provides further details of the accuracy adjustment of the score of the quantum feature.

Another embodiment further combines, into the combined set of scored features, a scored set of expert features, the further combining performed according to a measure of differences between the scored set of expert features and the scored set of quantum features, a score of an expert feature in the scored set of expert features comprising an expert evaluation of a utility of the expert feature in predicting a result involving the resource. Thus, the embodiment includes a scored set of expert features within the combined set of scored features.

Another embodiment constructs, using a natural language processing system, the combined set of scored features, and the valuation, a natural language explanation of the valuation, the natural language explanation expressed in natural language form. Thus, the embodiment provides a natural language explanation of the valuation.

Another embodiment configures, according to the valuation, a computing system deployment, the computing system deployment including the resource. Thus, the embodiment uses the resource valuation to configure a computing system deployment.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
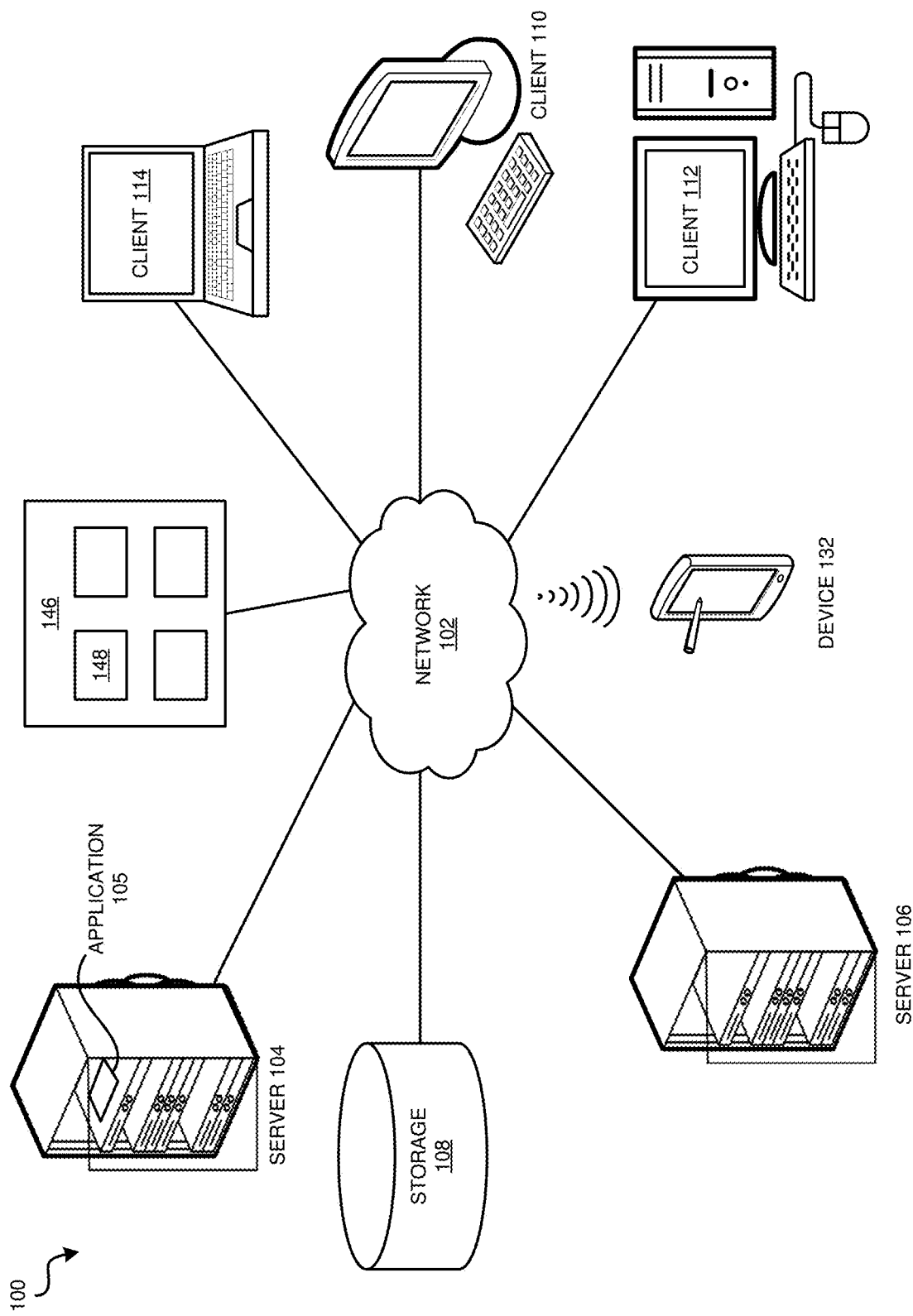
FIG. 1 depicts a block diagram of a network of data processing systems in which illustrative embodiments may be implemented.

The illustrative embodiments recognize that there is an unmet need for predictor valuation that is more accurate and more quickly computable than the techniques currently available. The illustrative embodiments recognize that the presently available tools or solutions do not address these needs or provide adequate solutions for these needs. The illustrative embodiments used to describe the invention generally address and solve the above-described problems and other problems related to combined classical/quantum predictor evaluation with model accuracy adjustment.

An embodiment can be implemented as a software application. The application implementing an embodiment can be configured as a modification of an existing predictor evaluation or data modelling system, as a separate application that operates in conjunction with an existing predictor evaluation or data modelling system, a standalone application, or some combination thereof.

Particularly, some illustrative embodiments provide a method that scores a set of classical features using a classical data model executing on a classical processor, divides the scored set of classical features into a set of feature groups, scores a set of quantum features using a quantum data model executing on the quantum processor and a feature group of the scored set of classical features, adjusts a score of a quantum feature according to an accuracy of the quantum data model, combines the scored set of classical features and the scored set of quantum features, and calculates, using the combined set of scored features and a first set of input data of a resource, a valuation of the resource.

An embodiment receives, as input, a set of data. In one embodiment, the data comprises a set of attribute-value pairs, in which the attribute labels or describes the data value. A data attribute is also referred to as a feature. For example, one attribute-value pair might have processor speed as the attribute and 2 GHz as the value. In another embodiment, the data comprises a stream, or set of values in order, labelled with the attribute. One non-limiting example of a stream is the output of a temperature measurement system, labelled with "temperature" and including a set of temperature measurement results obtained at one-hour intervals. The data may be historical, may be data of a currently occurring event, or a combination. One or more data attributes are potential predictors.

An embodiment also optionally receives, as input, a set of scored features associated with a training portion of the input, in which a score for a feature denotes an evaluation of that feature's, or data attribute's, usefulness in predicting an outcome or resource valuation. In embodiments, the received scored features were scored by a subject matter expert or another model, using a presently known technique.

An embodiment uses a classical data model executing on a classical processor to select and score a set of data attributes, or features, from input training data. One embodiment selects features to score using a set of heuristics. Another embodiment selects features to score using a set of analytical methods. Another embodiment selects features to score using an automated artificial intelligence tool, such as AutoAI. As well as feature selection, an embodiment fills in missing data for the selected features, scales feature data to a common scale, and performs other data cleanup for selected features and their data.

An embodiment selects a model type with which to analyze the input training data with respect to a feature being scored. One embodiment selects a model type based on a characteristic of the feature being scored. For example, if there are only two data values for an attribute, the embodiment selects a binary classification type model. As another example, if the attribute could have an unknowable set of possible values, the embodiment selects a regression type model. An embodiment recursively re-selects features and refines a selected model type and model weights and parameters until the model satisfies a completion criterion, such as optimizing accuracy, by obtaining a set of features that best predict a particular result. An embodiment uses a weight of a feature within the resulting model as the feature's score. Another embodiment selects and refines an ensemble of model types, adjusts each model in the ensemble's weights and parameters until each model satisfies a completion criterion, and combines the resulting weights from the different models into one score for a feature. The embodiment combines the resulting weights using any presently known weight-combining technique. Another embodiment scores features by multiplying a feature's weight by the absolute value of the Pearsons correlation coefficient, a presently known technique that measures the statistical relationship between two variables, providing information about the magnitude of the association between a predictor and a desired result. Another embodiment uses, instead of model weights, the output of a model's explainer module, which produces a score corresponding to an importance of a feature in predicting a desired result from that model. Different models' explainer module output can be compared to determine relative predictor importance between models. Another embodiment uses a presently known random forest technique to fit a random forest to input training data and scores features according to data fit. Another embodiment uses a gradient boosting decision tree algorithm, in which new models are created that predict the residuals or errors of prior models, then the model outputs are added together to make the final prediction. A gradient descent algorithm is used to minimize the loss when adding new models. One non-limiting example of a gradient boosting decision tree algorithm is the XGBoost algorithm. Other techniques for scoring predictors using a classical processor are also possible and contemplated within the scope of the illustrative embodiments.

An embodiment divides features scored by a classical data model into a set of groups. In embodiments, the number of features in a group is based on a qubit capability of a quantum processor to be used in scoring the features using a quantum data model, equal to a qubit capability of a quantum processor to be used in scoring the features using a quantum data model, or a mixture. For example, if a quantum processor processes fourteen qubits at a time, one embodiment forms groups of fourteen features each, with the remaining features in a group with fewer than fourteen features. One embodiment ranks features by their scores, as scored by a classical data model, and, starting from the highest-ranked feature, places a first number of ranked features into a first group, a second number of ranked features into a second group, and so on. Another embodiment ranks features by a combination of their scores, as scored by a classical data model, as well as Granger causality between time-series data features. A first time series of data is said to Granger-cause a second time series of data if it can be shown that values in the first time series provide statistically significant information about future values of the second time series. Although determining group size based on a qubit capability of a quantum processor improves quantum feature scoring efficiency, another embodiment uses additional criteria to determine group size, and not all groups need have the same size.

An embodiment uses one or more of the feature groups and a quantum data model executing on a quantum processor to select and score another set of data attributes, or features, from input training data. One embodiment scores a group of features using a quantum deep neural network (QDNN), a deep neural network implemented with quantum neural network layers (neural network layers implemented using a quantum processor) instead of a classical deep neural network's layers implemented using a classical processor. The output of the QDNN is fed into a classical deep neural network for further processing. Another embodiment scores a group of features using a quantum processor to perform a quadratic unconstrained binary optimization (QUBO) technique, which converts the feature scoring problem to an optimization problem. The embodiment then uses a presently known algorithm executing on a quantum processor to solve the optimization problem. Another embodiment scores a group of features using a quantum processor to perform quantum principal component analysis (QPCA), a dimensionality reduction algorithm. Another embodiment scores a group of features using Qkernel, a presently known software application which simulates a quantum processor. An embodiment feeds the results of the classical deep neural network, the QUBO, QPCA, or another method into a support-vector machine (SVM) implemented using a quantum processor simulator such as Qkernel. An SVM is a supervised learning model with associated learning algorithms that perform data classification and regression analysis. Other techniques for scoring predictors using a quantum processor are also possible and contemplated within the scope of the illustrative embodiments. Once one or more groups of features have been scored using a quantum processor, an embodiment merges the quantum processor-scored groups of features into a combined set of scored quantum features.

An embodiment adjusts one or more scores of quantum features according to an accuracy of the quantum data model. A quantum data model executing on a quantum processor produces probabilistic results. In other words, if the model is executed multiple times with the same set of parameter values and initial conditions, model output will not be exactly the same after each execution. Instead, the set of model outputs forms a probability distribution. Thus, an embodiment executes a quantum data model on training data for a number of iterations, combines the results of the iterations using a presently known technique (e.g., by averaging them), and compares the results to known results of feature scores using the training data to determine the model's accuracy with respect to a particular feature, denoted as accuracy$_{ki}$. Another embodiment determines the model's accuracy with respect to a particular feature using another presently known technique. An embodiment adjusts one or more scores of quantum features using the expression:

$$fir_i = \frac{1}{2}\left(e^{accuracy_{k_i}} * x_i\right) + \frac{1}{2}\left(\tan(accuracy_{k_i}) * x_i\right) + x_i$$

in which i denotes a feature index within the feature set, $k_i$ denotes the model number of which feature i is a predictor, xi denotes a score for the $i^{th}$ feature in the feature set, accuracy$_{ki}$ is in a range between 0 and 1, and fir$_i$ denotes the input score for the $i^{th}$ feature in the feature set adjusted according to a model's accuracy. The embodiment normalizes feature scores to a common scale between 0 and 1, using the expression:

$$\text{fir\_norm}_i = \frac{fir_i}{\sum_{j=0}^{n} fir_j}$$

in which j denotes a feature index within the feature set and n denotes the total number of features within the feature set.

An embodiment combines the scored set of classical features and the scored set of quantum features into a combined set of scored features. Another embodiment combines the scored set of classical features, a received set of features scored by a subject matter expert or another model (expert features), and the scored set of quantum features into a combined set of scored features. To combine feature sets, one embodiment selects a set of features that are common to all the input feature sets. Then, for a feature in the combined set, the embodiment multiples each of the feature's input scores together, including a scaling factor if necessary to normalize the scores to a common scale. Another embodiment applies a set of weights to one or more of the scored set of classical features, the expert features, and the scored set of quantum features as part of the combining. To combine feature sets, another embodiment ranks features in each input feature set by their scores, then combines the ranked features together according to differences in rankings between the input feature sets. One embodiment computes differences in rankings between features from different feature sets using the expressions:

$$q\_c_{rank\_diff} = \frac{\sum_{i=0}^{n} |q\_rank_i - c\_rank_i|}{max\_rank\_diff}$$

$$q\_sme_{rank\_diff} = \frac{\sum_{i=0}^{n} |q\_rank_i - sme\_rank_i|}{max\_rank\_diff}$$

$$c\_sme_{rank\_diff} = \frac{\sum_{i=0}^{n} |c\_rank_i - sme\_rank_i|}{max\_rank\_diff}$$

in which q_rank$_i$ denotes the rank of quantum feature i, c_rank$_i$ denotes the rank of classical feature i, sme_rank$_i$ denotes the rank of expert feature i, and max_rank_diff denotes the maximum rank difference between features.

An embodiment uses the combined set of scored features and input data to calculate a valuation of a resource or predict an output value. One embodiment calculates a valuation of a resource by using a product sum of feature value and weight. For example, to evaluate a computing resource when configuring a computing system deployment, the combined set of scored features might indicate that processor speed and network bandwidth are the most important features in determining a computing resource's throughput, and that valuation is proportional to both processor speed and throughput. Thus, a resource having a processor speed of 2 GHz and a network bandwidth of 100 megabits per second might be half as valuable than a resource having a processor speed of 4 GHz and a network bandwidth of 200 megabits per second, and the higher-speed resource should be selected for the deployment instead of the lower-speed resource. As another example, to predict a height of a cloud layer above the ground, the combined set of scored features might indicate that temperature, atmospheric pressure, and dew point (the temperature below which water droplets begin to condense) are the most important features in determining a height of a cloud layer above the ground. Thus, given an atmospheric pressure of 1013 millibars, and a temperature and dew point of eight degrees Celsius each, an embodiment might predict that the cloud layer is zero meters above the ground (in other words, fog is forming or about to form). Note that these examples have been extremely simplified only for ease of illustration, and do not represent the complexity of actual data analysis implementations. Another embodiment uses the combined set of scored features and input data to calculate a valuation of a resource or predict an output value not globally, but in relation to other resources or values. For example, to evaluate a computing resource in relation to other resources when configuring a computing system deployment, one might want to assemble a set of differently-configured resources, such as some resources optimized for compute-intensive jobs and some resources optimized for network bandwidth-intensive jobs. One non-limiting example of a technique for calculating a valuation of a resource or predict an output value in relation to other resources or values uses Shapley values; other techniques are also presently known.

One embodiment uses the combined set of scored features and a single set of input data to calculate a valuation of a resource or predict an output value. For example, input data for valuing a computing resource might include the resource's processor speed and network bandwidth. Another embodiment uses the combined set of scored features and a stream of input data to generate a stream of valuations or predictions. For example, a cloud height prediction system might receive a stream of temperature, dew point, and pressure measurements, and output a corresponding stream of predictions. Time intervals of input and output streams need not be the same.

An embodiment uses a natural language processing system, the combined set of scored features, and the valuation or prediction to construct a natural language explanation of the valuation or prediction expressed in natural language form. For example, for the example computing resources described herein, an embodiment might construct a natural language explanation such as, "Because Resource A's processor speed of 2 GHz and network bandwidth of 100 megabits per second are half as useful than Resource B's processor speed of 4 GHz and network bandwidth of 200 megabits per second in the deployment you are configuring, I suggest deploying Resource B instead of Resource A." As another example, for the weather prediction described herein, an embodiment might construct a natural language explanation such as, "Because the temperature-dew point spread is currently zero, cloud height is also predicted to be zero meters above ground and fog is likely to form within the next hour."

Some predictors are better at predicting a short-term result than a longer-term result, and vice versa. For example, because cloud height is determined by current atmospheric conditions, the current temperature-dew point spread might be useful in predicting cloud height for the next hour or two, but unlikely to be as useful in predicting a cloud height for a day next week or next month. As another example, transactions on a shopping website might exhibit daily (e.g. less activity at 3 am in a particular time zone than at 8 pm) and seasonal (e.g. more activity during December than in July) variations, so time of day might be more useful in predicting the next hour's transaction load, and valuing a resource with which to handle that load, than next December's. Thus, one embodiment uses a classical data model executing on a classical processor to select and score two or more sets of features from input training data, with each set of features using a different time horizon. The embodiment uses the sets of feature scores to select a set of highest-scored, or best, features of each set for each time horizon, and uses a quantum data model executing on a quantum processor to select and score another two or more sets of features from input training data, with each set of quantum features using a different time horizon. For each time horizon, the embodiment correlates the scored sets of classical and quantum features into a combined set of scored features. The embodiment uses the combined set of scored features and input data to calculate a valuation of a resource or predict an output value for a particular time horizon in a manner described herein.

The manner of combined classical/quantum predictor evaluation with model accuracy adjustment described herein is unavailable in the presently available methods in the technological field of endeavor pertaining to data modelling and prediction. A method of an embodiment described herein, when implemented to execute on a device or data processing system, comprises substantial advancement of the functionality of that device or data processing system in scoring a set of classical features using a classical data model executing on a classical processor, dividing the scored set of classical features into a set of feature groups, scoring a set of quantum features using a quantum data model executing on the quantum processor and a feature group of the scored set of classical features, adjusting a score of a quantum feature according to an accuracy of the quantum data model, combining the scored set of classical features and the scored set of quantum features, and calculating, using the combined set of scored features and a first set of input data of a resource, a valuation of the resource.

The illustrative embodiments are described with respect to certain types of input data, attributes, features, predictions, valuations, evaluations, combinations, models, forecasts, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
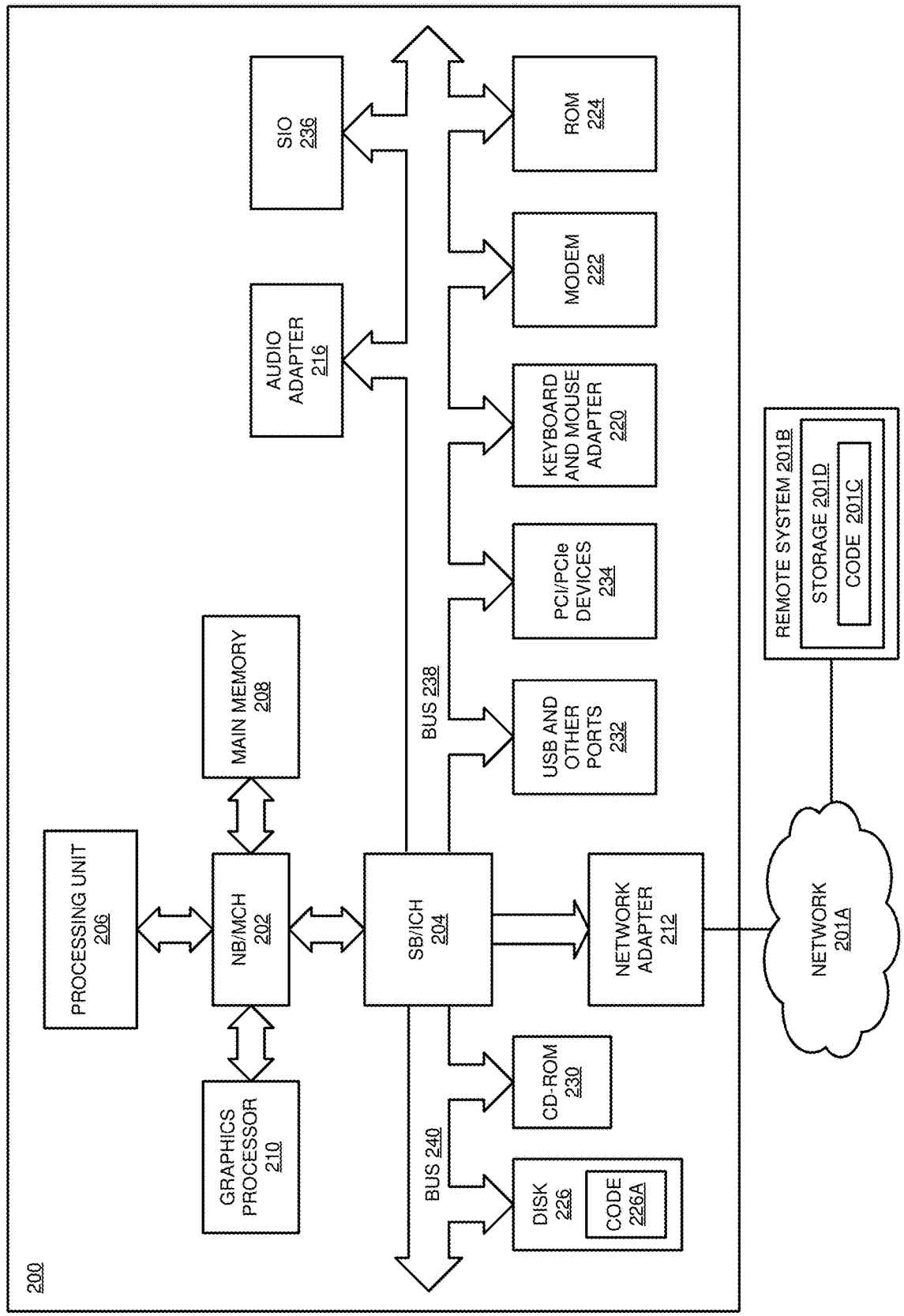
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

A quantum computing device 146 comprises one or more q-processors 148. A currently viable qubit is an example of q-processor 148. Quantum computing device 148 may couple to network 102 using wired connections, wireless communication protocols, or other suitable data connectivity.

Application 105 implements an embodiment described herein. Application 105 executes partially in any of servers 104 and 106, clients 110, 112, and 114, and device 132, and partially in quantum computing device 148.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
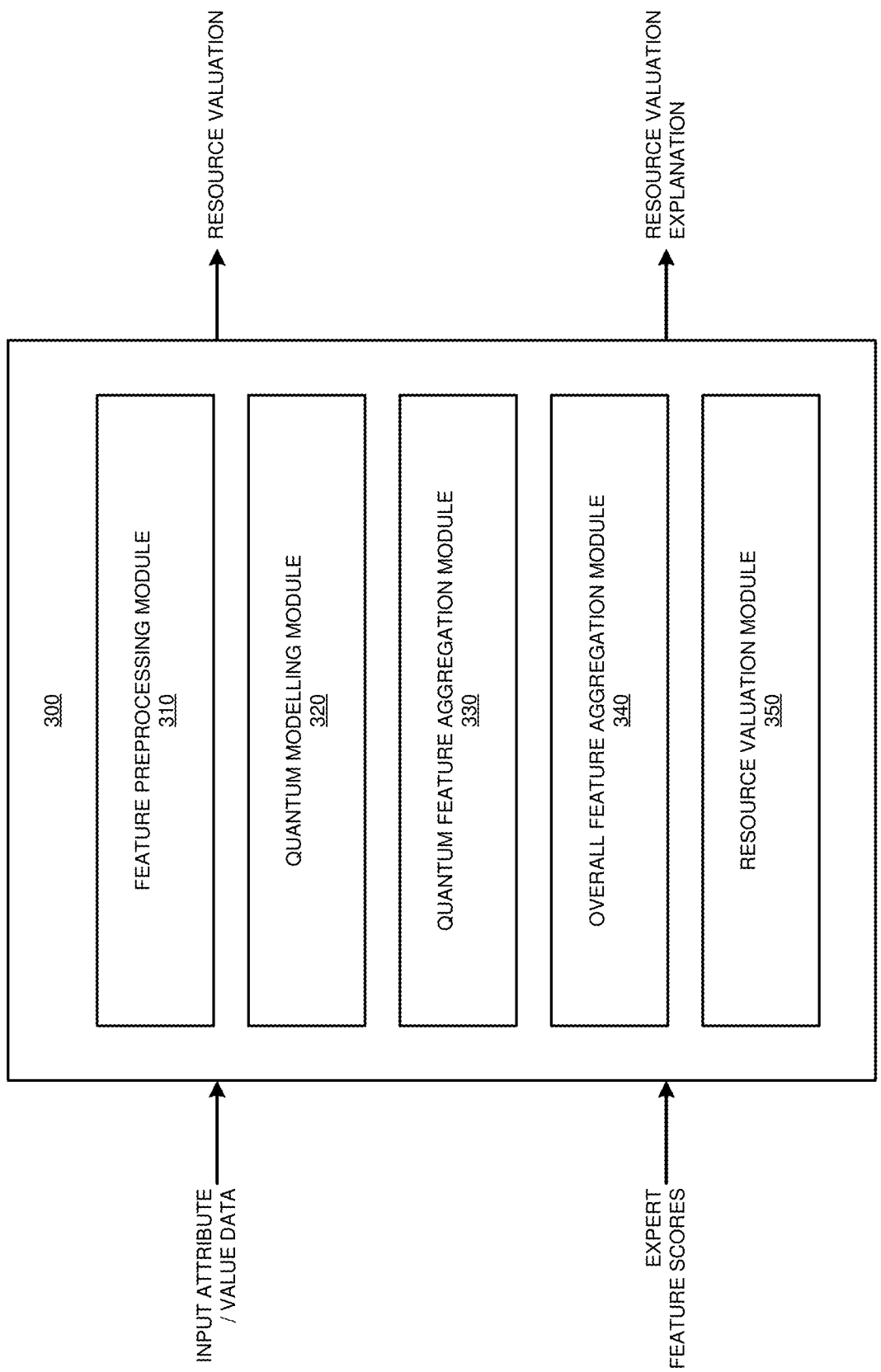
FIG. 3 depicts a block diagram of an example configuration for combined classical/quantum predictor evaluation with model accuracy adjustment in accordance with an illustrative embodiment.

With reference to FIG. 3, this figure depicts a block diagram of an example configuration for combined classical/quantum predictor evaluation with model accuracy adjustment in accordance with an illustrative embodiment. Application 300 is an example of application 105 in FIG. 1 and executes partially in any of servers 104 and 106, clients 110, 112, and 114, and device 132, and partially in quantum computing device 148 in FIG. 1.

Application 300 receives, as input, a set of data. In one implementation of application 300, the data comprises a set of attribute-value pairs, in which the attribute labels or describes the data value. A data attribute is also referred to as a feature. The data may be historical, may be data of a currently occurring event, or a combination. One or more data attributes are potential predictors. Application 300 also optionally receives, as input, a set of scored features associated with a training portion of the input, in which a score for a feature denotes an evaluation of that feature's, or data attribute's, usefulness in predicting an outcome or resource valuation. The received scored features have been previously scored by a subject matter expert or another model, using a presently known technique.

Feature preprocessing module 310 uses a classical data model executing on a classical processor to select and score a set of data attributes, or features, from input training data. One implementation of module 310 selects features to score using a set of heuristics. Another implementation of module 310 selects features to score using a set of analytical methods. Another implementation of module 310 selects features to score using an automated artificial intelligence tool, such as AutoAI. As well as feature selection, module 310 fills in missing data for the selected features, scales feature data to a common scale, and performs other data cleanup for selected features and their data.

Module 310 selects a model type with which to analyze the input training data with respect to a feature being scored. One implementation of module 310 selects a model type based on a characteristic of the feature being scored. Module 310 recursively re-selects features and refines a selected model type and model weights and parameters until the model satisfies a completion criterion, such as optimizing accuracy, by obtaining a set of features that best predict a particular result. Module 310 uses a weight of a feature within the resulting model as the feature's score. Another implementation of module 310 selects and refines an ensemble of model types, adjusts each model in the ensemble's weights and parameters until each model satisfies a completion criterion, and combines the resulting weights from the different models into one score for a feature. The implementation combines the resulting weights using any presently known weight-combining technique. Another implementation of module 310 scores features by multiplying a feature's weight by the absolute value of the Pearsons correlation coefficient, a presently known technique that measures the statistical relationship between two variables, providing information about the magnitude of the association between a predictor and a desired result. Another implementation of module 310 uses, instead of model weights, the output of a model's explainer module, which produces a score corresponding to an importance of a feature in predicting a desired result from that model. Different models' explainer module output can be compared to determine relative predictor importance between models. Another implementation of module 310 uses a presently known random forest technique to fit a random forest to input training data and scores features according to data fit. Another implementation of module 310 uses a gradient boosting decision tree algorithm, in which new models are created that predict the residuals or errors of prior models, then the model outputs are added together to make the final prediction. A gradient descent algorithm is used to minimize the loss when adding new models. One non-limiting example of a gradient boosting decision tree algorithm is the XGBoost algorithm. Other techniques for scoring predictors using a classical processor are also possible and contemplated within the scope of the illustrative embodiments.

Module 310 divides features scored by a classical data model into a set of groups. In implementations of module 310, the number of features in a group is based on a qubit capability of a quantum processor to be used in scoring the features using a quantum data model, equal to a qubit capability of a quantum processor to be used in scoring the features using a quantum data model, or a mixture. For example, if a quantum processor processes fourteen qubits at a time, one embodiment forms groups of fourteen features each, with the remaining features in a group with fewer than fourteen features. One implementation of module 310 ranks features by their scores, as scored by a classical data model, and, starting from the highest-ranked feature, places a first number of ranked features into a first group, a second number of ranked features into a second group, and so on. Another implementation of module 310 ranks features by a combination of their scores, as scored by a classical data model, as well as Granger causality between time-series data features. Another implementation of module 310 uses additional criteria to determine group size, and not all groups need have the same size.

Quantum modelling module 320 uses one or more of the feature groups and a quantum data model executing on a quantum processor to select and score another set of data attributes, or features, from input training data. More detail of module 320 is provided within the discussion of FIG. 5 herein.

Quantum feature aggregation module 330 adjusts one or more scores of quantum features according to an accuracy of the quantum data model. More detail of module 330 is provided within the discussion of FIG. 6 herein.

One implementation of overall feature aggregation module 340 combines the scored set of classical features and the scored set of quantum features into a combined set of scored features. Another implementation of module 340 combines the scored set of classical features, a received set of features scored by a subject matter expert or another model (expert features), and the scored set of quantum features into a combined set of scored features. To combine feature sets, one implementation of module 340 selects a set of features that are common to all the input feature sets. Then, for a feature in the combined set, the implementation multiples each of the feature's input scores together, including a scaling factor if necessary to normalize the scores to a common scale. To combine feature sets, another implementation of module 340 ranks features in each input feature set by their scores, then combines the ranked features together according to differences in rankings between the input feature sets.

Resource valuation module 350 uses the combined set of scored features and input data to calculate a valuation of a resource or predict an output value. One implementation of module 350 calculates a valuation of a resource by using a product sum of feature value and weight. Another implementation of module 350 uses the combined set of scored features and input data to calculate a valuation of a resource or predict an output value not globally, but in relation to other resources or values.

One implementation of module 350 uses the combined set of scored features and a single set of input data to calculate a valuation of a resource or predict an output value. Another implementation of module 350 uses the combined set of scored features and a stream of input data to generate a stream of valuations or predictions. Module 350 also uses a natural language processing system, the combined set of scored features, and the valuation or prediction to construct a natural language explanation of the valuation or prediction expressed in natural language form.

Figure 4:
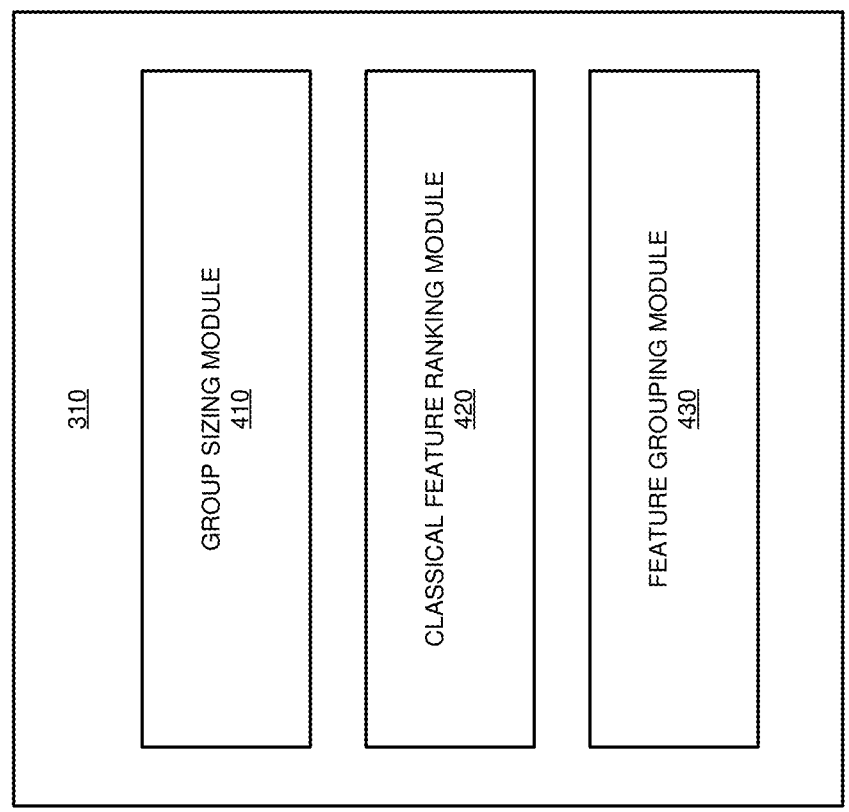
FIG. 4 depicts a block diagram of an example configuration for combined classical/quantum predictor evaluation with model accuracy adjustment in accordance with an illustrative embodiment.

With reference to FIG. 4, this figure depicts a block diagram of an example configuration for combined classical/quantum predictor evaluation with model accuracy adjustment in accordance with an illustrative embodiment. Feature preprocessing module 310 is the same as feature preprocessing module 310 in FIG. 3. In particular, FIG. 4 provides more detail of feature preprocessing module 310 in FIG. 3.

Group sizing module 410 determines the number of features in a group. In implementations of module 410, the group size is based on a qubit capability of a quantum processor to be used in scoring the features using a quantum data model, equal to a qubit capability of a quantum processor to be used in scoring the features using a quantum data model, or a mixture. For example, if a quantum processor processes fourteen qubits at a time, one implementation of module 410 determines that a group size of fourteen is to be used.

Classical feature ranking module 420 uses a classical data model executing on a classical processor to select and score a set of data attributes, or features, from input training data.

Feature grouping module 430 divides features scored by a classical data model into a set of groups, using at least in part the group size determined by group sizing module 410. One implementation of module 430 ranks features by their scores, as scored by a classical data model, and, starting from the highest-ranked feature, places a first number of ranked features into a first group, a second number of ranked features into a second group, and so on. Another implementation of module 430 ranks features by a combination of their scores, as scored by a classical data model, as well as Granger causality between time-series data features.

Figure 5:
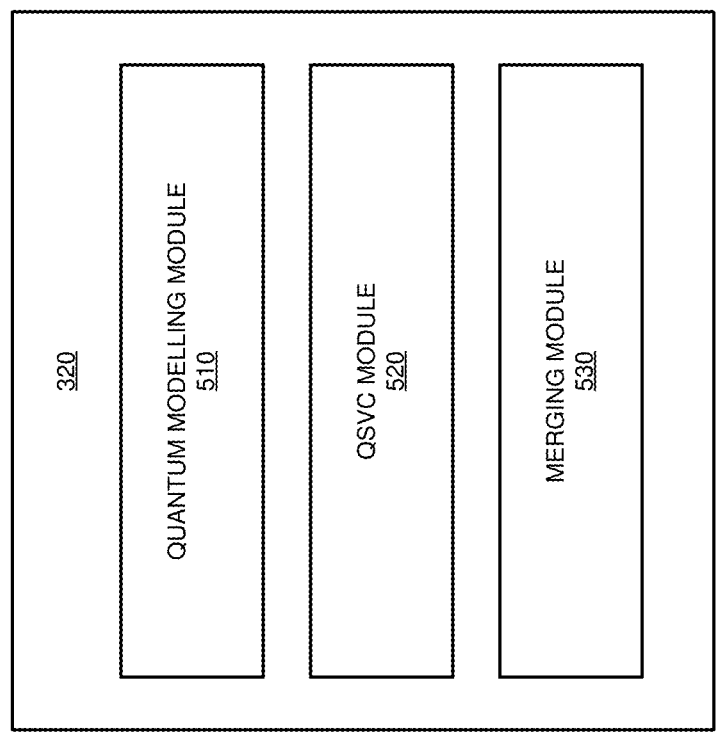
FIG. 5 depicts a block diagram of an example configuration for combined classical/quantum predictor evaluation with model accuracy adjustment in accordance with an illustrative embodiment.

With reference to FIG. 5, this figure depicts a block diagram of an example configuration for combined classical/quantum predictor evaluation with model accuracy adjustment in accordance with an illustrative embodiment. Quantum modelling module 320 is the same as quantum modelling module 320 in FIG. 3. In particular, FIG. 5 provides more detail of module 320 in FIG. 3.

One implementation of quantum modelling module 510 scores a group of features using a QDNN. The output of the QDNN is fed into a classical deep neural network for further processing. Another implementation of quantum modelling module 510 scores a group of features using a quantum processor to perform a QUBO technique, which converts the feature scoring problem to an optimization problem. The implementation then uses a presently known algorithm executing on a quantum processor to solve the optimization problem. Another implementation of quantum modelling module 510 scores a group of features using a quantum processor to perform QPCA. Another implementation of quantum modelling module 510 scores a group of features using Qkernel.

QSVC module 520 implements an SVM using a quantum processor simulator such as Qkernel. Module 520 takes, as inputs, the results of the classical deep neural network, the QUBO, QPCA technique, or another method.

Merging module 530 merges the quantum processor-scored groups of features into a combined set of scored quantum features.

Figure 6:
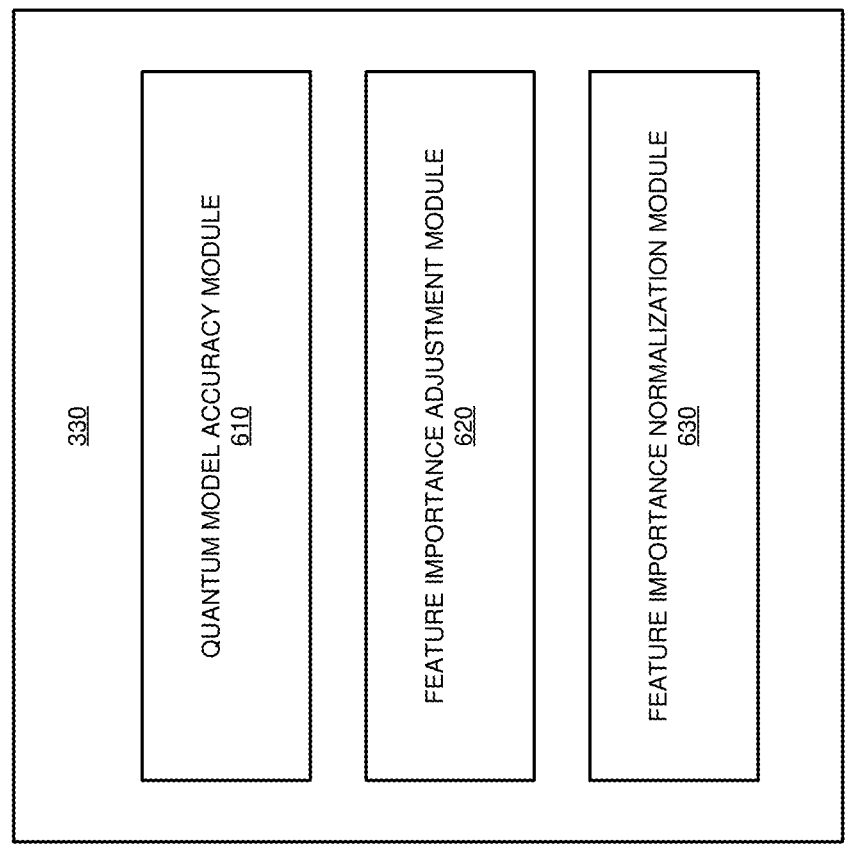
FIG. 6 depicts a block diagram of an example configuration for combined classical/quantum predictor evaluation with model accuracy adjustment in accordance with an illustrative embodiment.

With reference to FIG. 6, this figure depicts a block diagram of an example configuration for combined classical/quantum predictor evaluation with model accuracy adjustment in accordance with an illustrative embodiment. Module 330 is the same as module 330 in FIG. 3. In particular, FIG. 6 provides more detail of module 330 in FIG. 3.

Quantum model accuracy module 610 executes a quantum data model on training data for a number of iterations, combines the results of the iterations using a presently known technique (e.g., by averaging them), and compares the results to known results of feature scores using the training data to determine the model's accuracy with respect to a particular feature, denoted as $accuracy_{ki}$.

Feature importance adjustment module 620 adjusts one or more scores of quantum features using the expression:

$$fir_i = \frac{1}{2}\left(e^{accuracy_{k_i}} * x_i\right) + \frac{1}{2}\tan(accuracy_{k_i}) * x_i + x_i$$

and feature importance normalization module 630 normalizes feature scores to a common scale between 0 and 1, using the expression:

$$\text{fir\_norm}_i = \frac{fir_i}{\sum_{j=0}^{n} fir_j}$$

Figure 7:
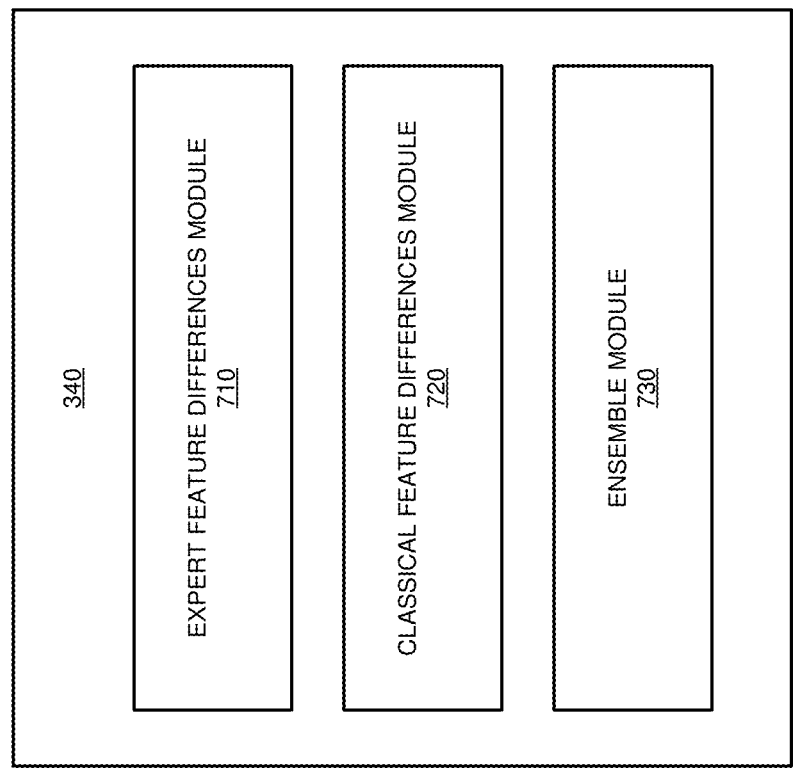
FIG. 7 depicts a block diagram of an example configuration for combined classical/quantum predictor evaluation with model accuracy adjustment in accordance with an illustrative embodiment.

With reference to FIG. 7, this figure depicts a block diagram of an example configuration for combined classical/quantum predictor evaluation with model accuracy adjustment in accordance with an illustrative embodiment. Module 340 is the same as module 340 in FIG. 3. In particular, FIG. 7 provides more detail of module 340 in FIG. 3. Expert feature differences module 710 computes differences in rankings between features from the quantum and expert feature sets using the expression:

$$\text{q\_sme}_{rank\_diff} = \frac{\sum_{i=0}^{n} |\text{q\_rank}_i - \text{sme\_rank}_i|}{\text{max\_rank\_diff}}$$

Classical feature differences module 720 computes differences in rankings between features from the quantum and classical feature sets using the expression:

$$\text{q\_c}_{rank\_diff} = \frac{\sum_{i=0}^{n} |\text{q\_rank}_i - \text{c\_rank}_i|}{\text{max\_rank\_diff}}$$

Ensemble module 730 combines the ranked features together according to differences in rankings between the input feature sets.

Figure 8:
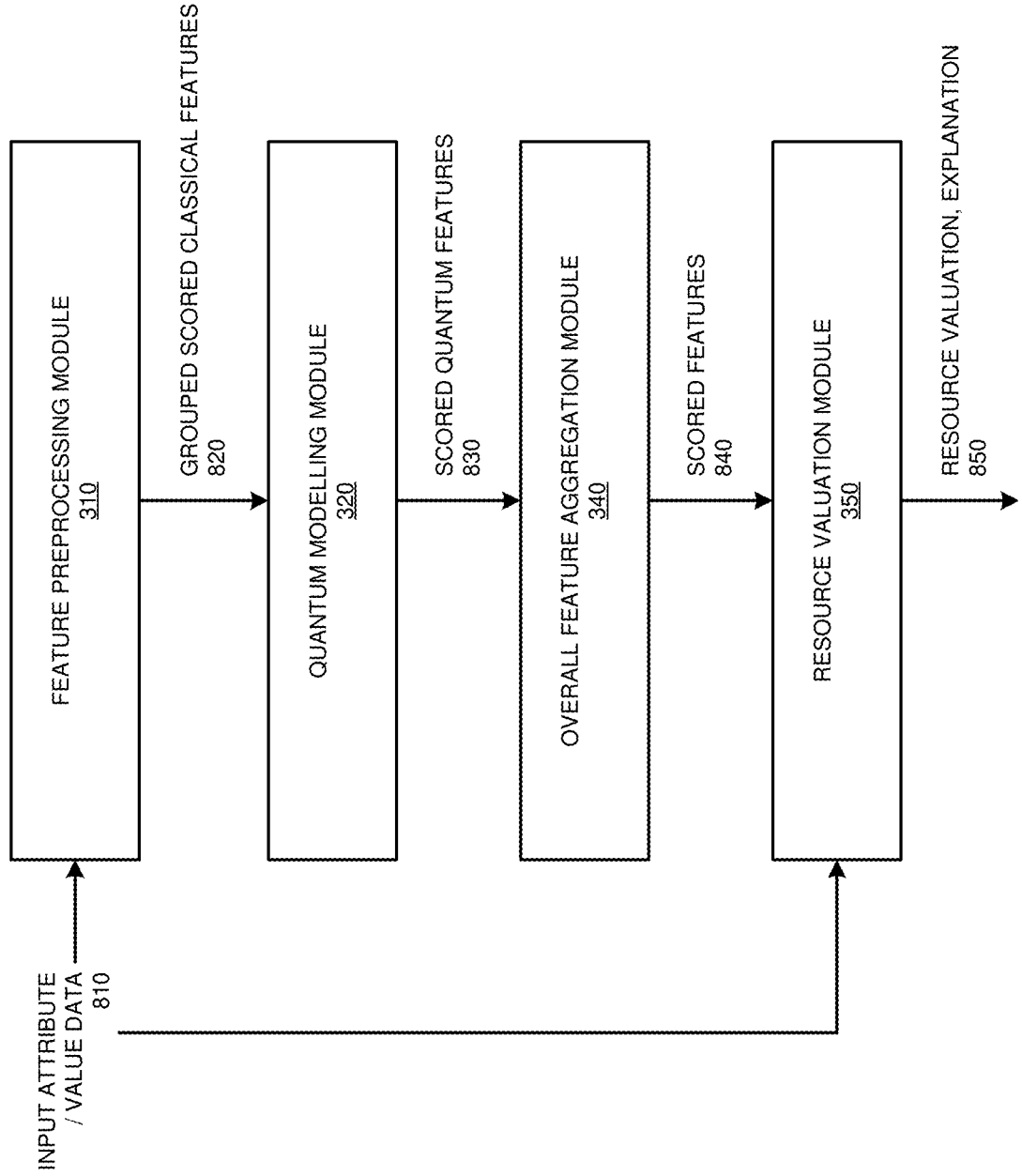
FIG. 8 depicts an example of combined classical/quantum predictor evaluation with model accuracy adjustment in accordance with an illustrative embodiment.

With reference to FIG. 8, this figure depicts an example of combined classical/quantum predictor evaluation with model accuracy adjustment in accordance with an illustrative embodiment. The example can be executed using application 300 in FIG. 3. Modules 310, 320, 340, and 350 are the same as modules 310, 320, 340, and 350 in FIG. 3.

Module 310 receives, as input, input attribute/value data 810, and produces grouped scored classical features 820. Grouped scored classical features 820 are input to module 320, producing scored quantum features 830. Scored quantum features 830 are input to module 340, producing scored features 840. Module 350 uses scored features 840 and input attribute/value data 810 to produce resource valuation 850.

Figure 9:
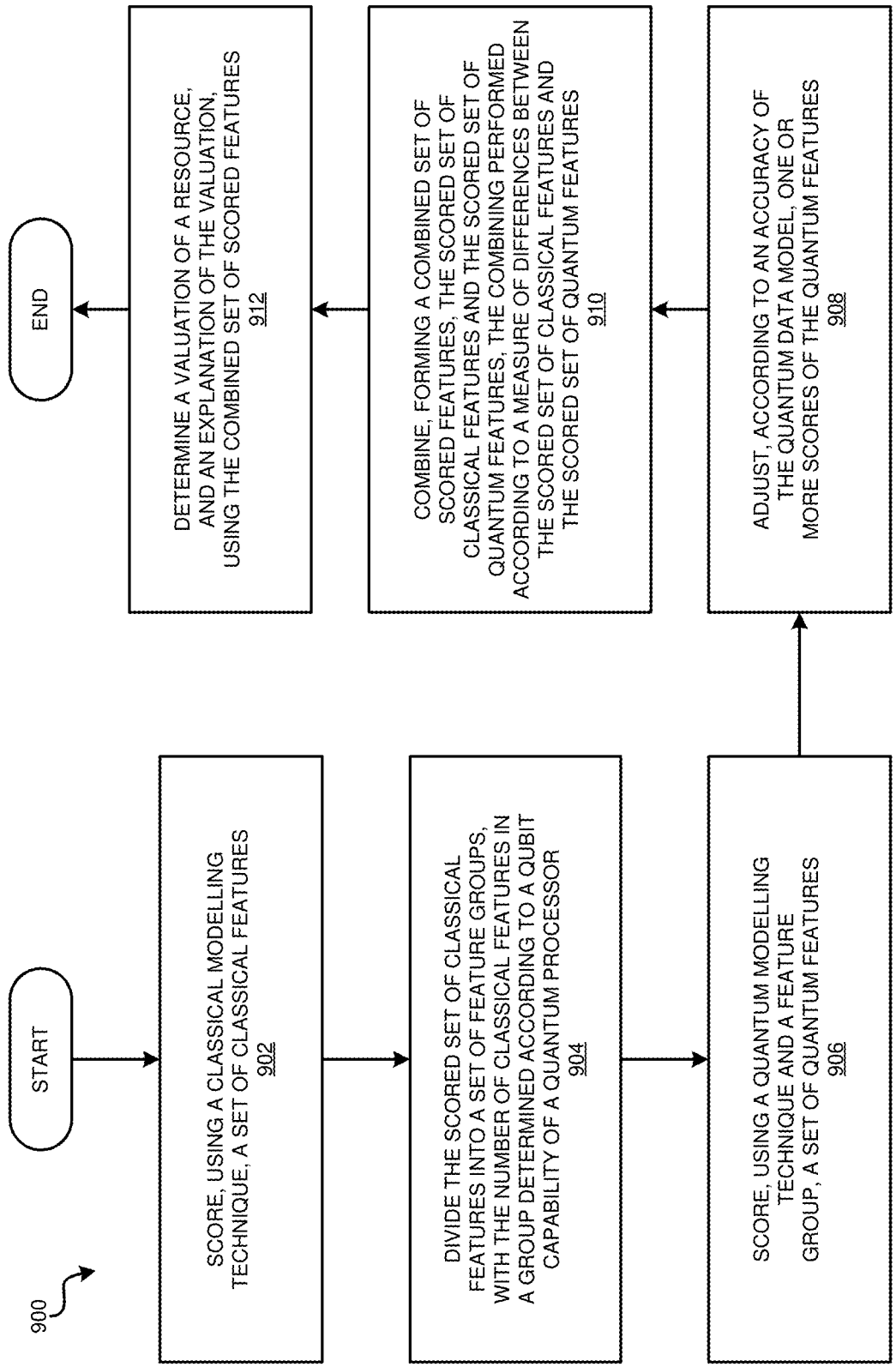
FIG. 9 depicts a flowchart of an example process for combined classical/quantum predictor evaluation with model accuracy adjustment in accordance with an illustrative embodiment.

With reference to FIG. 9, this figure depicts a flowchart of an example process for combined classical/quantum predictor evaluation with model accuracy adjustment in accordance with an illustrative embodiment. Process 900 can be implemented in application 300 in FIG. 3.

In block 902, the application scores, using a classical modelling technique, a set of classical features. In block 904, the application divides the scored set of classical features into a set of feature groups, with the number of classical features in a group determined according to a qubit capability of a quantum processor. In block 906, the application scores, using a quantum modelling technique and a feature group, a set of quantum features. In block 908, the application adjusts, according to an accuracy of the quantum data model, one or more scores of the quantum features. In block 910, the application combines, forming a combined set of scored features, the scored set of classical features and the scored set of quantum features, the combining performed according to a measure of differences between the scored set of classical features and the scored set of quantum features. In block 912, the application determines a valuation of a resource, and an explanation of the valuation, using the combined set of scored features. Then the application ends.

Figure 10:
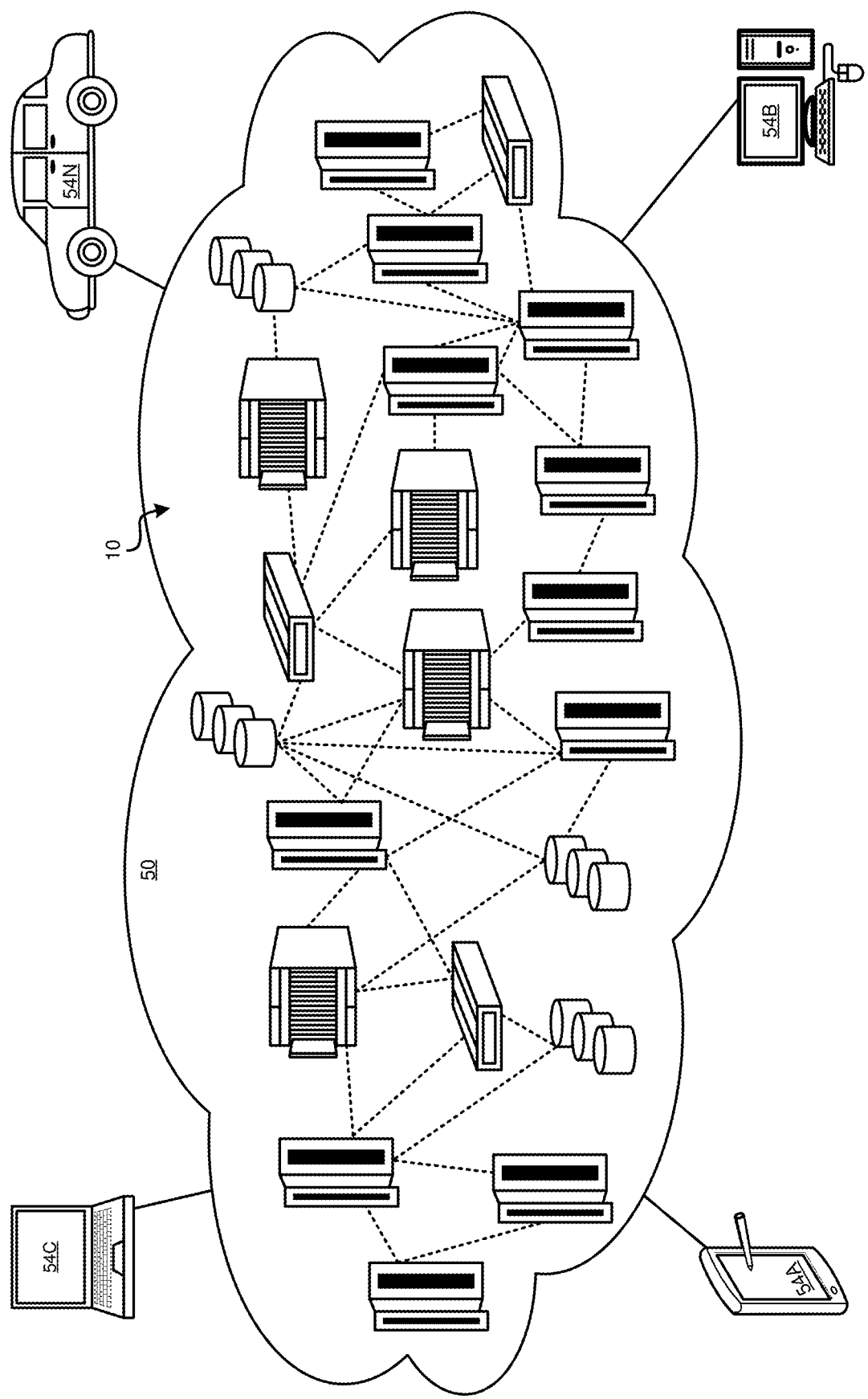
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 11:
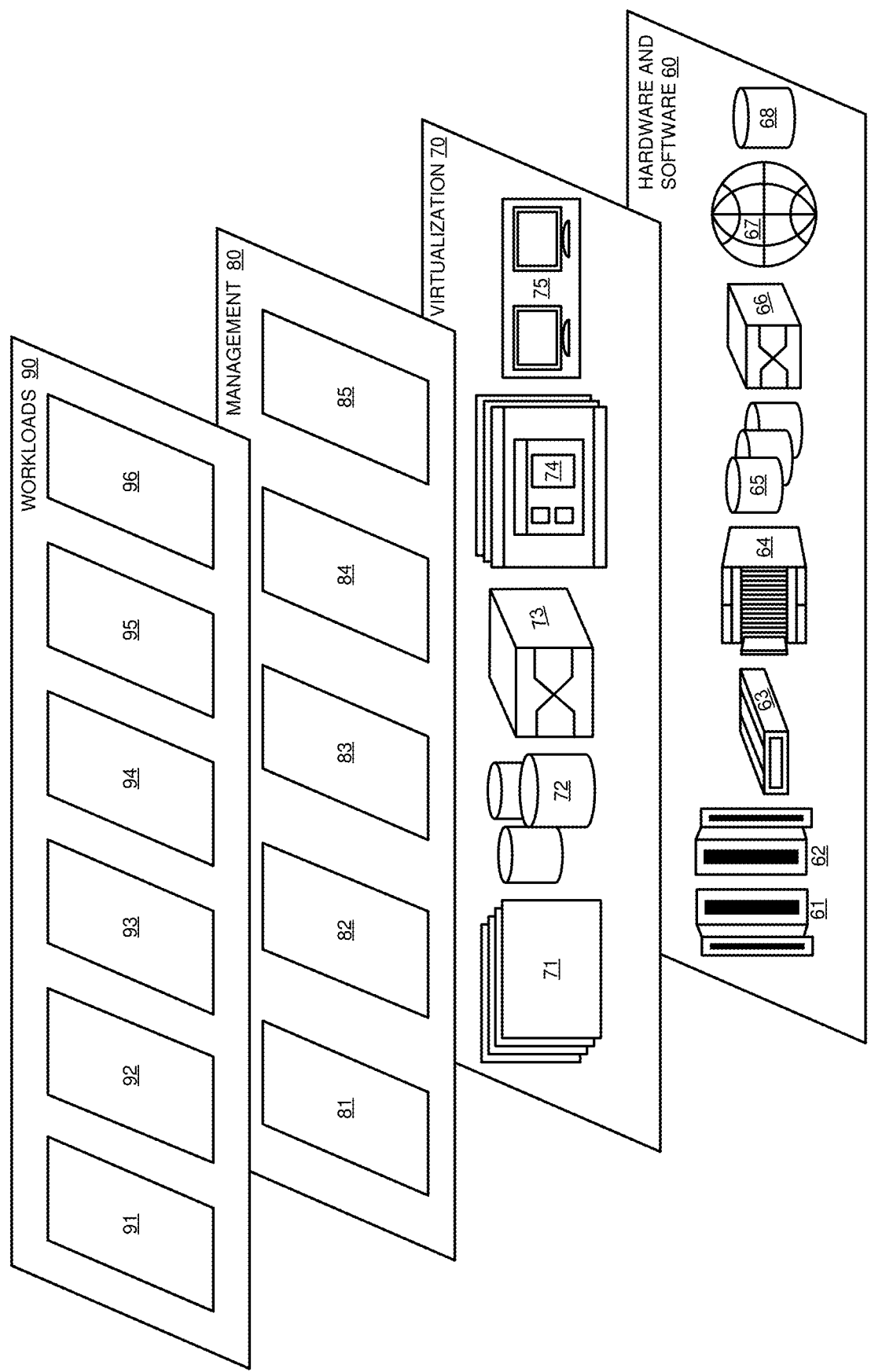
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for combined classical/quantum predictor evaluation with model accuracy adjustment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    scoring, using a classical data model executing on a classical processor, a set of classical features, a classical feature in the set of classical features comprising a first attribute of a resource, a score of the classical feature comprising an evaluation of a utility of the classical feature in predicting a result involving the resource, the scoring resulting a scored set of classical features;
    scoring, using a quantum data model executing on a quantum processor and a feature group selected from the scored set of classical features, a set of quantum features, a quantum feature in the set of quantum features comprising a second attribute of the resource, a score of the quantum feature comprising an evaluation of a utility of the quantum feature in predicting the result, the scoring resulting a scored set of quantum features;
    combining, forming a combined set of scored features, the scored set of classical features and the scored set of quantum features; and
    calculating, using the combined set of scored features and a first set of input data of the resource, the result involving the resource.

2. The computer-implemented method of claim 1, further comprising:
    dividing the scored set of classical features into a set of feature groups, the set of feature groups including the feature group, a number of classical features in the feature group determined according to a qubit capability of the quantum processor, wherein members of each feature group in the set of feature groups are determined according to a ranking, the ranking determined according to a score of each classical feature in the scored set of classical features.

3. The computer-implemented method of claim 1, further comprising:
    adjusting, according to an accuracy of the quantum data model, the score of the quantum feature;
    computing, for each score in the set of scored quantum features using the accuracy of the quantum data model, an adjusted score; and
    normalizing, by dividing each adjusted score by a sum of adjusted scores, each adjusted score.

4. The computer-implemented method of claim 1, further comprising:
    further combining, into the combined set of scored features, a scored set of expert features, wherein the combining the scored set of classical features and the scored set of quantum features is performed according to a measure of differences between the scored set of classical features and the scored set of quantum features, and the further combining is performed according to a measure of differences between the scored set of expert features and the scored set of quantum features, a score of an expert feature in the scored set of expert features comprising an expert evaluation of a utility of the expert feature in predicting a result involving the resource.

5. The computer-implemented method of claim 1, wherein the result involving the resource comprises a valuation of the resource, further comprising:
    constructing, using a natural language processing system, the combined set of scored features, and the valuation, a natural language explanation of the valuation, the natural language explanation expressed in natural language form.

6. The computer-implemented method of claim 5, further comprising:
    configuring, according to the valuation, a computing system deployment, the computing system deployment including the resource.

7. A computer program product for predictor evaluation, the computer program product comprising:
    one or more computer readable storage media, and program instructions collectively stored on the one or more computer readable storage media, the program instructions comprising:
    program instructions to score, using a classical data model executing on a classical processor, a set of classical features, a classical feature in the set of classical features comprising a first attribute of a resource, a score of the classical feature comprising an evaluation of a utility of the classical feature in predicting a result involving the resource, the scoring resulting a scored set of classical features;
    program instructions to score, using a quantum data model executing on a quantum processor and a feature group selected from the scored set of classical features, a set of quantum features, a quantum feature in the set of quantum features comprising a second attribute of the resource, a score of the quantum feature comprising an evaluation of a utility of the quantum feature in predicting the result, the scoring resulting a scored set of quantum features;

program instructions to combine, forming a combined set of scored features, the scored set of classical features and the scored set of quantum features; and program instructions to calculate, using the combined set of scored features and a first set of input data of the resource, the result involving the resource.

8. The computer program product of claim 7, further comprising:
program instructions to divide the scored set of classical features into a set of feature groups, the set of feature groups including the feature group, a number of classical features in the feature group determined according to a qubit capability of the quantum processor, wherein members of each feature group in the set of feature groups are determined according to a ranking, the ranking determined according to a score of each classical feature in the scored set of classical features.

9. The computer program product of claim 7, further comprising:
program instructions to adjust, according to an accuracy of the quantum data model, the score of the quantum feature;
program instructions to compute, for each score in the set of scored quantum features using the accuracy of the quantum data model, an adjusted score; and
program instructions to normalize, by dividing each adjusted score by a sum of adjusted scores, each adjusted score.

10. The computer program product of claim 7, the stored program instructions further comprising:
program instructions to further combine, into the combined set of scored features, a scored set of expert features, wherein the program instructions to combine the scored set of classical features and the scored set of quantum features are performed according to a measure of differences between the scored set of classical features and the scored set of quantum features, and the program instructions to further combine are performed according to a measure of differences between the scored set of expert features and the scored set of quantum features, a score of an expert feature in the scored set of expert features comprising an expert evaluation of a utility of the expert feature in predicting a result involving the resource.

11. The computer program product of claim 7, wherein the result involving the resource comprises a valuation of the resource, the stored program instructions further comprising:
program instructions to construct, using a natural language processing system, the combined set of scored features, and the valuation, a natural language explanation of the valuation, the natural language explanation expressed in natural language form.

12. The computer program product of claim 11, the stored program instructions further comprising:
program instructions to configure, according to the valuation, a computing system deployment, the computing system deployment including the resource.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to score, using a classical data model executing on a classical processor, a set of classical features, a classical feature in the set of classical features comprising a first attribute of a resource, a score of the classical feature comprising an evaluation of a utility of the classical feature in predicting a result involving the resource, the scoring resulting a scored set of classical features;
program instructions to score, using a quantum data model executing on a quantum processor and a feature group selected from the scored set of classical features, a set of quantum features, a quantum feature in the set of quantum features comprising a second attribute of the resource, a score of the quantum feature comprising an evaluation of a utility of the quantum feature in predicting the result, the scoring resulting a scored set of quantum features;
program instructions to combine, forming a combined set of scored features, the scored set of classical features and the scored set of quantum features; and
program instructions to calculate, using the combined set of scored features and a first set of input data of the resource, the result involving the resource.

17. The computer system of claim 16, further comprising:
program instructions to divide the scored set of classical features into a set of feature groups, the set of feature groups including the feature group, a number of classical features in the feature group determined according to a qubit capability of the quantum processor, wherein members of each feature group in the set of feature groups are determined according to a ranking, the ranking determined according to a score of each classical feature in the scored set of classical features.

18. The computer system of claim 16, further comprising:
program instructions to adjust, according to an accuracy of the quantum data model, the score of the quantum feature;
program instructions to compute, for each score in the set of scored quantum features using the accuracy of the quantum data model, an adjusted score; and
program instructions to normalize, by dividing each adjusted score by a sum of adjusted scores, each adjusted score.

19. The computer system of claim 16, the stored program instructions further comprising:
program instructions to further combine, into the combined set of scored features, a scored set of expert features, wherein the program instructions to combine the scored set of classical features and the scored set of quantum features are performed according to a measure of differences between the scored set of classical features and the scored set of quantum features, and the program instructions to further combine are performed according to a measure of differences between the scored set of expert features and the scored set of quantum features, a score of an expert feature in the scored set of expert features comprising an expert evaluation of a utility of the expert feature in predicting a result involving the resource.

20. The computer system of claim 16, wherein the result involving the resource comprises a valuation of the resource, the stored program instructions further comprising: program instructions to construct, using a natural language processing system, the combined set of scored features, and the valuation, a natural language explanation of the valuation, the natural language explanation expressed in natural language form.

21. The computer system of claim 20, the stored program instructions further comprising:
   program instructions to configure, according to the valuation, a computing system deployment, the computing system deployment including the resource.

22. A data processing environment comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to score, using a classical data model executing on a classical processor, a set of classical features, a classical feature in the set of classical features comprising a first attribute of a resource, a score of the classical feature comprising an evaluation of a utility of the classical feature in predicting a result involving the resource, the scoring resulting a scored set of classical features;
   program instructions to score, using a quantum data model executing on a quantum processor and a feature group selected from the scored set of classical features, a set of quantum features, a quantum feature in the set of quantum features comprising a second attribute of the resource, a score of the quantum feature comprising an evaluation of a utility of the quantum feature in predicting the result, the scoring resulting a scored set of quantum features;
   program instructions to combine, forming a combined set of scored features, the scored set of classical features and the scored set of quantum features; and
   program instructions to calculate, using the combined set of scored features and a first set of input data of the resource, the result involving the resource.

23. The data processing environment of claim 22, further comprising:
   program instructions to divide the scored set of classical features into a set of feature groups, the set of feature groups including the feature group, a number of classical features in the feature group determined according to a qubit capability of the quantum processor, wherein members of each feature group in the set of feature groups are determined according to a ranking, the ranking determined according to a score of each classical feature in the scored set of classical features.

24. The data processing environment of claim 22, further comprising:
   program instructions to adjust, according to an accuracy of the quantum data model, the score of the quantum feature;
   program instructions to compute, for each score in the set of scored quantum features using the accuracy of the quantum data model, an adjusted score; and
   program instructions to normalize, by dividing each adjusted score by a sum of adjusted scores, each adjusted score.

25. A hybrid classical-quantum computing environment comprising one or more classical processors, one or more quantum processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to score, using a classical data model executing on a classical processor, a set of classical features, a classical feature in the set of classical features comprising a first attribute of a resource, a score of the classical feature comprising an evaluation of a utility of the classical feature in predicting a result involving the resource, the scoring resulting a scored set of classical features;
   program instructions to score, using a quantum data model executing on a quantum processor and a feature group selected from the scored set of classical features, a set of quantum features, a quantum feature in the set of quantum features comprising a second attribute of the resource, a score of the quantum feature comprising an evaluation of a utility of the quantum feature in predicting the result, the scoring resulting a scored set of quantum features;
   program instructions to combine, forming a combined set of scored features, the scored set of classical features and the scored set of quantum features; and
   program instructions to calculate, using the combined set of scored features and a first set of input data of the resource, the result involving the resource.

* * * * *